United States Patent
Fausak et al.

(10) Patent No.: US 11,070,551 B2
(45) Date of Patent: Jul. 20, 2021

(54) SYSTEM AND METHOD FOR REMOTE ACCESS TO A PERSONAL COMPUTER AS A SERVICE USING A REMOTE DESKTOP PROTOCOL AND WINDOWS HELLO SUPPORT

(71) Applicant: Dell Products L.P., Round Rock, TX (US)

(72) Inventors: Andrew T. Fausak, Coppell, TX (US); Oleg Rombakh, Los Gatos, CA (US); Charles D. Robison, Jr., Buford, GA (US); Carlton A. Andrews, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 447 days.

(21) Appl. No.: 15/874,730

(22) Filed: Jan. 18, 2018

(65) Prior Publication Data

US 2019/0222571 A1 Jul. 18, 2019

(51) Int. Cl.
| | |
|---|---|
| *H04L 29/06* | (2006.01) |
| *G06F 13/42* | (2006.01) |
| *G06F 13/38* | (2006.01) |
| *G06F 21/62* | (2013.01) |
| *G06F 21/32* | (2013.01) |

(52) U.S. Cl.
CPC ........ *H04L 63/0861* (2013.01); *G06F 13/385* (2013.01); *G06F 13/4282* (2013.01); *G06F 21/32* (2013.01); *G06F 21/6209* (2013.01); *H04L 63/0281* (2013.01); *G06F 2213/0016* (2013.01); *G06F 2213/0042* (2013.01)

(58) Field of Classification Search
CPC ............. H04L 63/0861; H04L 63/0281; G06F 13/383; G06F 13/4282; G06F 21/32; G06F 21/6209; G06F 2213/0016
See application file for complete search history.

(56) References Cited

U.S. PATENT DOCUMENTS

| | | | | |
|---|---|---|---|---|
| 6,493,717 | B1 * | 12/2002 | Junkin | G06F 16/972 707/754 |
| 7,308,579 | B2 * | 12/2007 | Abela | G06Q 20/3821 380/278 |
| 2011/0145904 | A1 * | 6/2011 | Pizano | H04L 63/0861 726/7 |

(Continued)

OTHER PUBLICATIONS

Microsoft Windows Hello for Business, Sep. 8, 2017, 133 pages.

(Continued)

*Primary Examiner* — Paul E Callahan
(74) *Attorney, Agent, or Firm* — Baker Botts L.L.P.

(57) ABSTRACT

Systems and methods for a network environment for client-side remote access of a server device from a client device may utilize a biometric sensor device of the client device and a pluggable authentication and authorization framework. The biometric sensor device may capture a gesture of a target user. The server device may authenticate the target user based on previously registered encrypted biometric information of the target user utilizing the pluggable authentication and authorization framework and a remote desktop protocol. When the target user has been authenticated, the client device may be authorized to access a service of the server device.

14 Claims, 8 Drawing Sheets

(56) References Cited

U.S. PATENT DOCUMENTS

| | | | | |
|---|---|---|---|---|
| 2016/0027399 A1* | 1/2016 | Wilde | ............... | G06T 1/60 |
| | | | | 345/520 |
| 2016/0088474 A1* | 3/2016 | Smith | ............... | H04W 12/06 |
| | | | | 370/310 |
| 2016/0094546 A1* | 3/2016 | Innes | ............... | H04L 63/0823 |
| | | | | 713/156 |
| 2018/0011973 A1* | 1/2018 | Fish | ............... | G06F 21/35 |
| 2018/0060547 A1* | 3/2018 | Holz | ............... | G06F 21/32 |
| 2018/0203988 A1* | 7/2018 | Hamlin | ............... | G06F 21/36 |

OTHER PUBLICATIONS

D. Hardt, Microsoft, Internet Engineering Task Force (IETF) "The OAuth 2.0 Authorization Framework" Oct. 2012, 76 pages.

Emily Ryan's "Enable more secure business growth with multi-factor authentication" Intel, Solution Brief, 4 pages, 2016.

\* cited by examiner

```
RECEIVING A SET OF LOGIN CREDENTIALS FROM A CLIENT DEVICE VIA A
NETWORK
                                │
                                ▼
OPENING A GUEST ACCOUNT ON A HOST OF THE SERVER DEVICE THAT MAY
BE BASED ON THE RECEIVED SET OF LOGIN CREDENTIALS TO ESTABLISH A
RDP SESSION BETWEEN THE CLIENT DEVICE AND THE HOST OF THE SERVER
                             DEVICE
                                │
                                ▼
ACCESSING A GESTURE OF A TARGET USER OF THE CLIENT DEVICE THAT MAY
   BE CAPTURED BY A BIOMETRIC SENSOR DEVICE OF THE CLIENT DEVICE
    UTILIZING SERVER-SIDE SOFTWARE AND A VIRTUAL INTERFACE OF THE
       BIOMETRIC SENSOR DEVICE WITHIN THE RDP SESSION
                                │
                                ▼
AUTHENTICATING THE TARGET USER TO A TARGET ACCOUNT ON THE HOST OF
THE SERVER DEVICE THAT MAY BE BASED ON THE GESTURE AND ENCRYPTED
 BIOMETRIC INFORMATION OF THE TARGET USER UTILIZING THE SERVER-SIDE
                            SOFTWARE
                                │
                                ▼
AUTHENTICATING THE TARGET USER TO A TARGET ACCOUNT ON THE HOST OF
THE SERVER DEVICE THAT MAY BE BASED ON THE GESTURE AND ENCRYPTED
 BIOMETRIC INFORMATION OF THE TARGET USER UTILIZING THE SERVER-SIDE
                            SOFTWARE
```

FIG. 8

SYSTEM AND METHOD FOR REMOTE ACCESS TO A PERSONAL COMPUTER AS A SERVICE USING A REMOTE DESKTOP PROTOCOL AND WINDOWS HELLO SUPPORT

BACKGROUND

Field of the Disclosure

This disclosure relates generally to information handling systems and, more particularly, for remote access to a personal computer as a service using a remote desktop protocol and Windows Hello support.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one aspect, a disclosed information handling system may include a biometric sensor device and a client device. The client device may receive a gesture of a target user captured by the biometric sensor device. The client device may also, in response to receiving the gesture of the target user, unlock secure access information of the information handling system including encrypted biometric information of the target user and server-side unlock information based on the gesture and the encrypted biometric information of the target user utilizing client-side software of the client device. The client device may further communicate the encrypted biometric information of the target user and the server-side unlock information to a server device via a network utilizing a remote desktop protocol (RDP). The communication may cause server-side software of the server device to unlock server-side access information of the server device based on the server-side unlock information. The communication may also cause the server-side software may also authenticate the target user based on the encrypted biometric information of the target user and the server-side access information.

In any of the disclosed embodiments of the information handling system, the biometric sensor device may be at least one of a fingerprint reader, a facial recognition device, a gesture recognition device, an iris recognition device, a retinal scan identification device, a hand geometry recognition device, a voice recognition device, a vein and facial characteristics recognition device, and an illuminated IR sensor. The gesture may be at least one of a fingerprint, a face, a user gesture, an eye, a hand, a voice, and a vein.

In any of the disclosed embodiments of the information handling system, the biometric sensor device may be included in the client device.

In any of the disclosed embodiments of the information handling system, the biometric sensor device may include Intel® Authenticate hardware.

In any of the disclosed embodiments of the information handling system, the client-side software may include Intel® Authenticate software.

In any of the disclosed embodiments of the information handling system, the server-side software may include Microsoft Windows Hello.

In any of the disclosed embodiments of the information handling system, the secure access information may be stored at the biometric sensor device.

In any of the disclosed embodiments of the information handling system, the secure access information may be stored at a memory of the client device.

In any of the disclosed embodiments of the information handling system, the biometric sensor device may provide multifactor authentication policies to enforce user identity protection.

In another aspect, a disclosed information handling system may include a biometric sensor device and a client device. The client device may receive a gesture of a target user captured by the biometric sensor device. The client device may also, in response to receiving the gesture of the target user, unlock secure access information of the information handling system including encrypted biometric information of the target user that may be based on the gesture and the encrypted biometric information of the target user utilizing client-side software of the client device. The client device may further establish a virtual channel between the client device and a server device. The client device may also populate the virtual channel with the encrypted biometric information of the target user. The client device may further communicate an access request including the target user to the server device via a network utilizing the established virtual channel. The communication may cause server-side software of the server device to receive the access request. The communication may also cause the server-side software to authenticate the target user that may be based on the encrypted biometric information of the target user populated at the virtual channel.

In any of the disclosed embodiments of the information handling system, the biometric sensor device may include Intel® Authenticate hardware.

In any of the disclosed embodiments of the information handling system, the client-side software may include Intel® Authenticate software.

In any of the disclosed embodiments of the information handling system, the server-side software may include Microsoft Windows Hello.

In any of the disclosed embodiments of the information handling system, the secure access information may be stored at the biometric sensor device.

In yet another aspect, a disclosed information handling system may include a server device. The server device may receive a set of login credentials from a client device via a network. The server device may also open a guest account on a host of the server device that may be based on the received set of login credentials to establish a remote desktop protocol (RDP) session between the client device and the host of the server device. The server device may further access a gesture of a target user of the client device that may be captured by a biometric sensor device of the client device utilizing server-side software and a virtual interface of the biometric sensor device within the RDP session. The server device may also authenticate the target user to a target account on the host of the server device that may be based on the gesture and encrypted biometric information of the target user utilizing the server-side software. The server device may further, when the target user may be authenticated, open the target account and switch from the guest account to the target account that may allow the client device to access the target account.

In any of the disclosed embodiments of the information handling system, the server-side software may include Microsoft Windows Hello.

In any of the disclosed embodiments of the information handling system, the encrypted biometric information of the target user may be stored at the biometric sensor device.

In any of the disclosed embodiments of the information handling system, the encrypted biometric information of the target user may be stored at a memory of the server device.

In any of the disclosed embodiments of the information handling system, the virtual interface may include a virtual universal serial bus (USB) interface of the biometric sensor device.

In any of the disclosed embodiments of the information handling system, the biometric sensor device may be at least one of a fingerprint reader, a facial recognition device, a gesture recognition device, an iris recognition device, a retinal scan identification device, a hand geometry recognition device, a voice recognition device, a vein and facial characteristics recognition device, and an illuminated IR sensor, and wherein the gesture is at least one of a fingerprint, a face, a user gesture, an eye, a hand, a voice, and a vein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3, 5, and 7 wherein like numbers are used to indicate like and corresponding parts.

Figure 1:
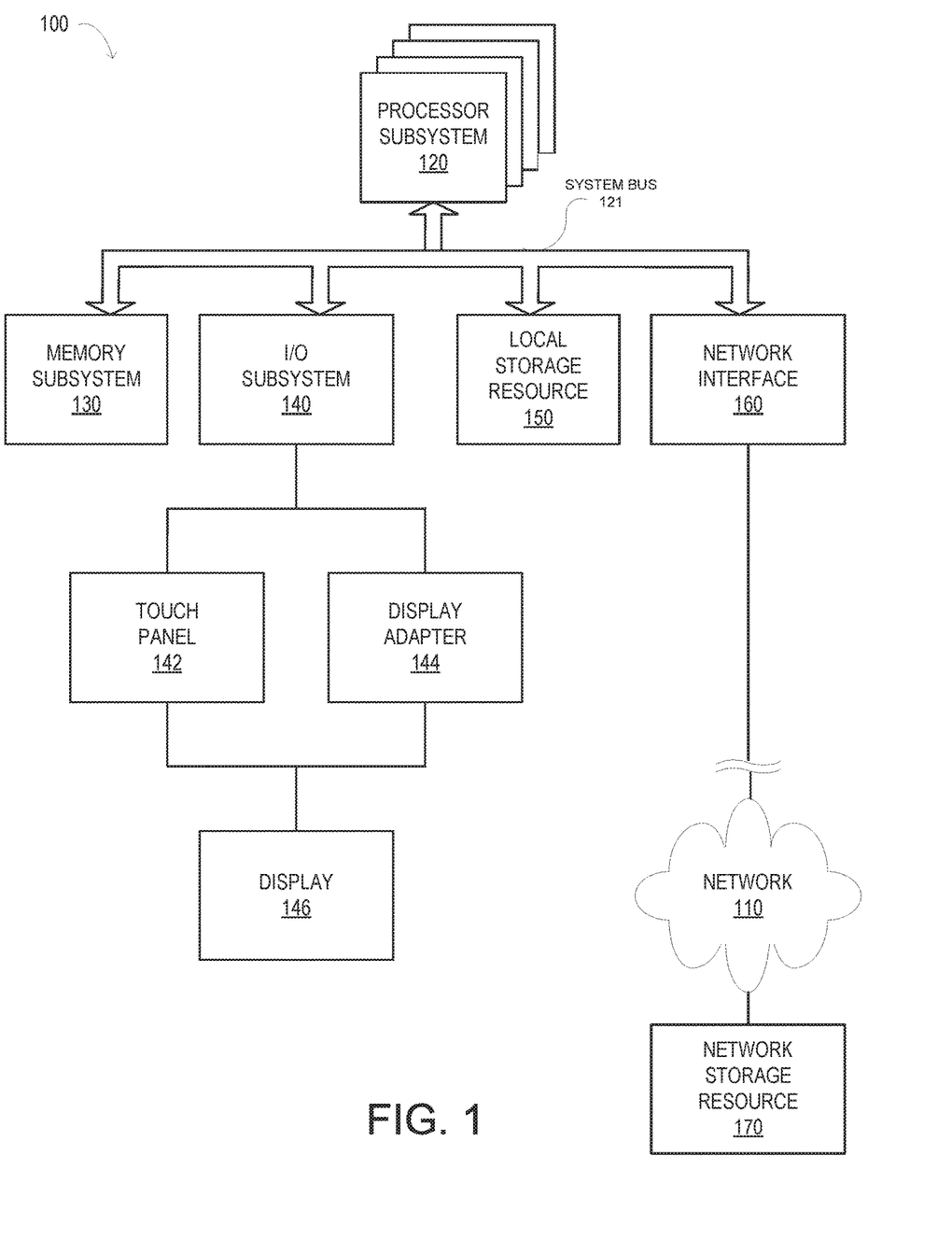
FIG. 1 is a block diagram of selected elements of an embodiment of an information handling system.

Turning now to the drawings, FIG. 1 illustrates a block diagram depicting selected elements of an embodiment of information handling system 100. As shown in FIG. 1, components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data).

In particular embodiments, network 110 may include one or more routers for routing data between client information handling systems 100 and/or server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/within system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display 146 that is driven by display adapter 144.

Figure 2:
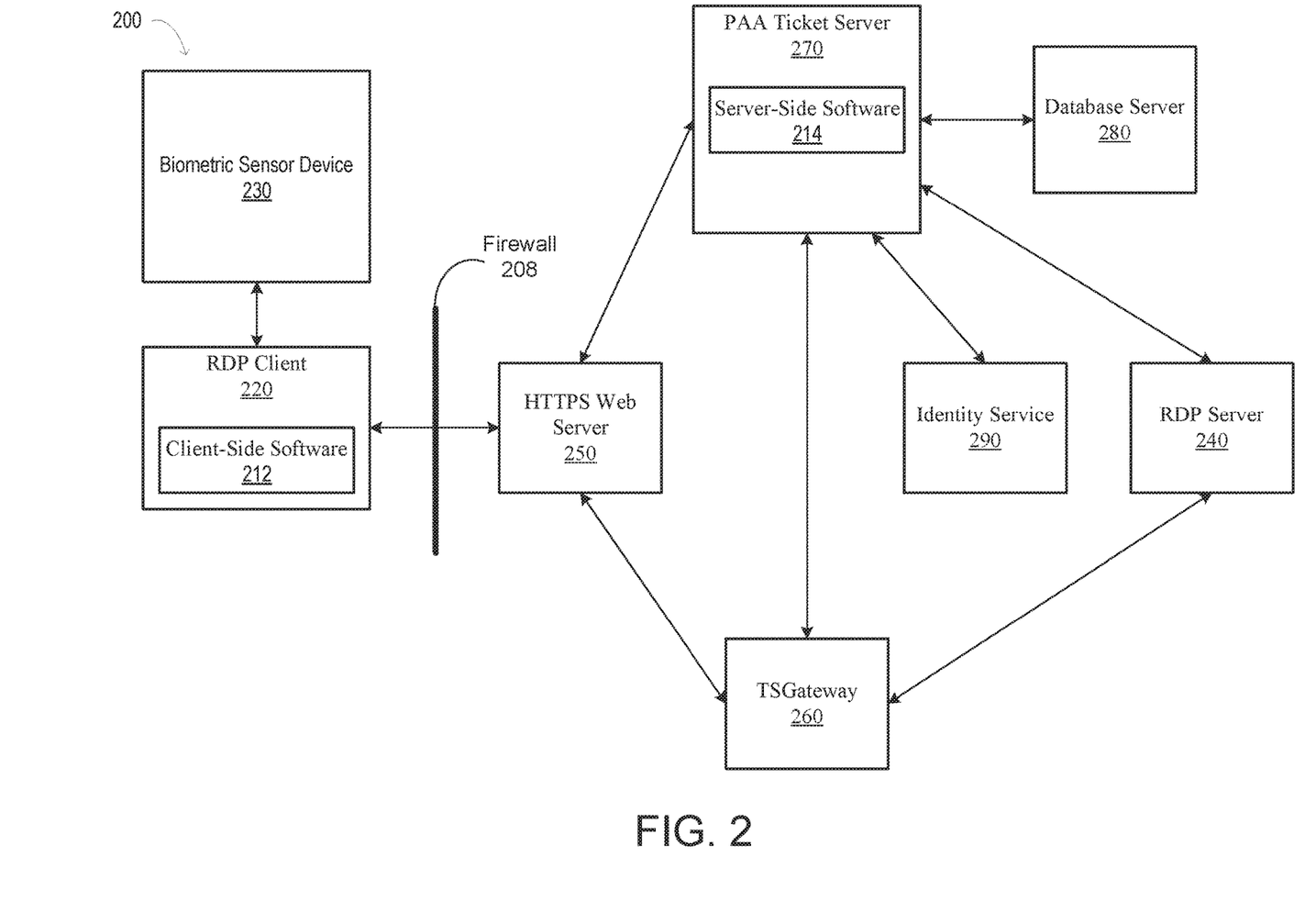
FIG. 2 depicts a block diagram depicting selected elements of an embodiment of an exemplary network environment utilizing a biometric sensor device and pluggable authentication and authorization.

Turning now to FIG. 2, a block diagram depicting selected elements of an embodiment of an exemplary network environment 200 utilizing a biometric sensor device and pluggable authentication and authorization. As shown in FIG. 2, components of network environment 200 may include, but are not limited to, one or more Remote Desktop Protocol (RDP) clients 220, one or more biometric sensor devices 230 corresponding to the one or more RDP clients 220, a firewall 308, one or more RDP servers 240, an HTTP Server (web server) 250, a Terminal Services Gateway (TSG) 260, a pluggable authentication and authorization (PAA) Ticket Server 270, a database server 280, and an identity service 290.

In FIG. 2, an RDP client 220 may be an information handling system 100. RDP client 220 may be a desktop computer, a laptop computer, a tablet computer, a handheld device, a mobile phone, a kiosk, a vending machine, a billboard, or any suitable information handling system. In particular embodiments, RDP client 220 is an embedded computer and may have flash memory (e.g. a solid state drive) instead of a hard disk drive. In particular embodiments, RDP client 220 is a thin client having limited processing capabilities and limited storage, and such a thin client may require minimal management and updates. RDP client 220 may communicate with an RDP server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

In FIG. 2, biometric sensor device 230 may be a fingerprint reader, a facial recognition device, a gesture recognition device, an iris recognition device, a retinal scan identification device, a hand geometry recognition device, a voice recognition device, a vein and facial characteristics recognition device, an illuminated IR sensor, a personal identification number recognition device, a personal identification phrase recognition device, or other biometric sensor devices, or a combination thereof. Biometric sensor device 230 may be utilized to provide multifactor authentication policies to enforce user identity protection for access to specific systems and resources including a corporate domain, a public network, a private network, one or more other RDP clients 220, one or more RDP servers 240 VPN, one or more protected databases, and the like, or a combination thereof. These factors may be captured, encrypted, matched, and stored in the hardware of biometric sensor device 230, which may reduce exposure to common software-level attack methods. In particular embodiments, these factors may be captured, encrypted, matched, and stored in hardware of a RDP server 240. Biometric sensor device 230 may be utilized to capture a user's biometric information and for matching the user's captured biometric information to the user's previously captured and authorized biometric information for user authentication and authorization. For example, a user can place a finger on the fingerprint reader and the fingerprint can be matched to the user's previously captured and authorized fingerprint. Biometric information may include one or more of a finger print, facial images of a face, facial characteristics of a face, a gesture of a user, an iris of an eye, retina blood vessels of an eye, hand geometry of a hand, a voice sample, blood flow of a vein, other physical user characteristics, an infrared radiation measurement, a heat measurement of a user, motion of a user, a personal identification number, a personal identification phrase, or another type of biometric information. As shown, biometric sensor device 230 is coupled to RDP client 220 via biometric connection 206. In one or more other embodiments, biometric sensor device 230 may be included within RDP client 220. In one or more embodiments, biometric sensor device 230 may be an Intel® Authenticate solution including Intel® Authenticate hardware and software included within RDP client 220 to provide multifactor authentication policies to enforce user identity protection for access to a corporate domain, a public network, a private network, one or more other RDP clients 220, one or more RDP servers 240, one or more protected databases, and the like, or a combination thereof. In one or more embodiments, biometric sensor device 230 may be utilized by Microsoft Windows Hello to authenticate and authorize a user to access protected Microsoft services.

In FIG. 2, firewall 308 may comprise one or more of a software-based network security system or a hardware-based network security system that screen the data traffic according to one or more pre-determined routing rule-sets. In particular embodiments, firewall 308 may comprise one or more network security systems developed by Microsoft Corporation. Furthermore, servers 240 may be deployed using Microsoft Enterprise servers. Herein, reference to the network security systems developed by Microsoft Corporation includes, but is not limited to, Microsoft Enterprise-based firewalls.

In FIG. 2, an RDP server 240 may be an information handling system 100. RDP server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g. corporate) network may include a device manager server and a repository server each configured to communicate with multiple RDP clients 220 across one or more domains, sites, or subnets of network 110. In particular embodiments, an RDP server 240 may include one or more servers, or functions of one or more servers. A RDP client 220 may access software resources provided by an RDP server 240 such as, for example, operating systems, add-ons, content, or any other suitable data, applications, or images. In particular embodiments, a RDP client 220 may access resources provided by an RDP server 240 only after providing suitable authentication information. Alternatively, an RDP server 240 may provide software or other resources automatically to one or more RDP clients 220.

In particular embodiments, RDP servers 240 may operate in one or more private networks that are incompatible with network 110. In particular embodiments, network 110 may be an untrusted network to RDP servers 240 operating behind one or more firewalls 208. In particular embodiments, RDP clients 220 may utilize data encryption for transporting unencrypted data traffic over one or more encrypted tunnels that bypass the firewalls. As an example and not by way of limitation, RDP client 220 may set up an encrypted secure shell (SSH) tunnel to a targeted RDP server 240 in order to access a network service provided by the targeted RDP server 240. In particular embodiments, RDP client 220 may be configured to forward a pre-determined local port to a port on the targeted RDP server 240. Once the encrypted SSH tunnel has been established, RDP client 220 may connect to the pre-determined local port to access the network service of the targeted RDP server 240. Accordingly, the encrypted SSH tunnel may provide security to unencrypted data traffic associated with the network service. In particular embodiments, RDP clients 220 may communicate with RDP servers 240 via a proxy server. As an example and not by way of limitation, one of RDP servers 240 behind the firewalls 208 may be a proxy server, HTTP Server 250, such that RDP client 220 may connect to the HTTP Server 250 in order to access a network service of another RDP server 240 that is coupled to HTTP Server 250. In particular embodiments, RDP client 220 may issue a request (e.g. HTTP CONNECT method) for connecting to TSG 260. Thereafter, TSG 260 may tunnel (or proxy) a transmission control protocol (TCP) based connection to that RDP server 240 and relay data traffic between that RDP server 240 and RDP client 220.

In FIG. 2, HTTP Server 250, TSG 260, PAA Ticket Server 270, database server 280, and identity service 290 may be an information handling system 100. Network environment 200 may provide a PAA framework to authenticate and/or authorize an RDP client 220 for access to one or more RDP servers 240. However, one of ordinary skill in the art would realize the PAA framework is not limited to RDP clients 220 and RDP servers 240, but may be used with any type of servers, such as: File Share, NFS, Print Server, Media Streaming Server, etc. In particular embodiments, PAA utilization may be described within network environment 200, including but not limited to, RDP client 220, one or more RDP servers 240, firewall 208, HTTP Server 250, TSG 260, PAA Ticket Server 270, database server 280, and identity service 290. Server-side software of RDP server 240 may be associated with the PAA framework. Generally, PAA may refer to a means to extend authorization on remote session hosts directly by use of PAA ticket server 270. In particular embodiments, PAA may serve to allow RDP clients 220 to authenticate and query authorization from PAA ticket server 270 without worrying whether the actual authentication happens against a file or is passed on to another PAA server, such as, for example identity service 290 or database server 280.

During a run time phase of operation, RDP client 220 may request access to a service of a remote RDP server 240 using client-side software 212. Client-side software 212 may be supported by the native operating system of RDP client 220, which may be a non-Windows based operating system. For example, client-side software 212 may include a hypertext markup language (HTML) client browser application, which may be used to request access to a service of RDP server 240. In one or more embodiments, client-side software 212 may further include Intel® Authenticate software. In one or more embodiments, server-side software 214 may be supported by a Microsoft Windows based operating system. For example, server-side software 214 may include Microsoft Windows Hello.

In one or more embodiments, in response to the access request, client-side software 212 may receive a gesture of a target user captured by biometric sensor device 230. In response to receiving the gesture of the target user, the client-side software may authenticate the target user based on the received gesture and previously registered biometric information of the target user, which may be securely stored at a memory of biometric sensor device 230 in encrypted form. The encrypted biometric information of the target user may have been established during a registration process with biometric sensor device 230. When the target user has been authenticated, RDP client 220 may communicate the encrypted biometric information of the target user to PAA ticket server 270 of server information handling system 100 via webserver 250 using the RPD protocol. PAA ticket server 270 may receive the encrypted biometric information of the target user from RDP client 220 utilizing the RDP protocol and server-side software 214. In response to receiving the encrypted biometric information of the target user, PAA ticket server 270 may authenticate the target user based on the received encrypted biometric information of the target user of RDP client 220. When the target user of RDP client 220 has been authorized, PAA ticket server 270 may generate a ticket to allow RDP client 220 to access the requested service of the remote RDP server 240.

In one or more other embodiments, RDP client 220 may communicate the access request to PAA ticket server 270 via webserver 250. In response to receiving the access request, the server-side software 214 may receive a gesture of a target user captured by biometric sensor device 230 using RPC protocol and previously established virtual IO. In response to receiving the gesture of the target user, PAA ticket server 270 may authenticate the target user based on the gesture and previously registered encrypted biometric information of the target user. When the target user of RDP client 220 has been authorized, PAA ticket server 270 may generate a ticket to allow RDP client 220 to access the requested service of the remote RDP server 240.

In one or more embodiments, all communication and data transmission between RDP client 220 and server information handling system 100 may be encrypted during transmission and decrypted after being received.

Figure 3:
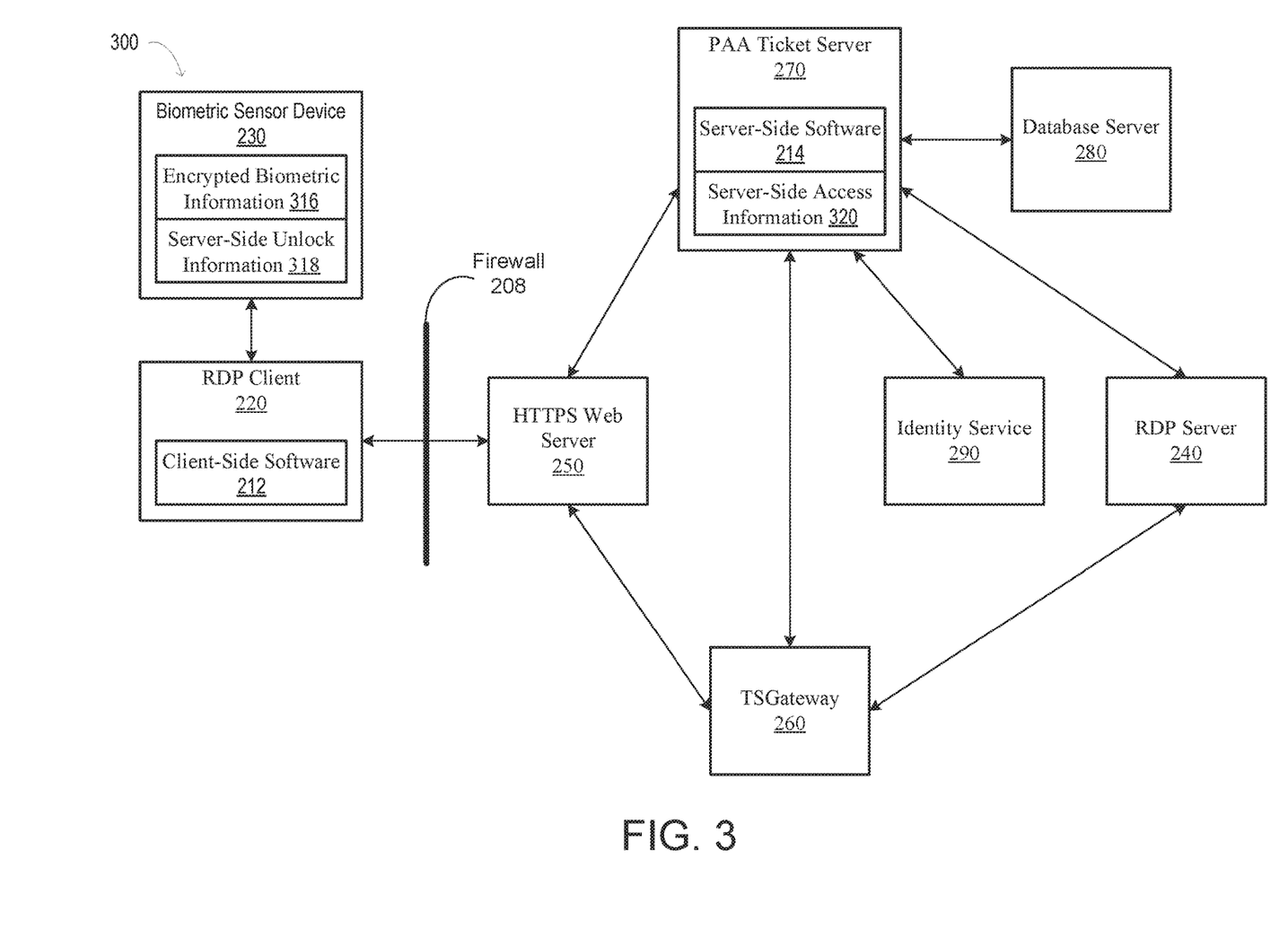
FIG. 3 is an example of a network environment for client-side remote access of a server device from a client device utilizing a biometric sensor device and pluggable authentication and authorization.

FIG. 3 illustrates an example of a network environment 300 for client-side remote access of RDP server 240 utilizing RDP client 220, biometric sensor device 230, client-side software 212, server-side software 214, and the PAA framework.

During a run time phase of operation, RDP client 220 may request access to a service of a remote RDP server 240 using client-side software 212. In response to the access request, the client-side software may receive a gesture of a target user captured by biometric sensor device 230. In response to receiving the gesture of the target user, client-side software 212 may authenticate the target user based on the received gesture and encrypted biometric information 316 of the target user stored at a memory of biometric sensor device 230. Server-side unlock information 318 for RDP server 240 and secure access information for RDP server 240 may also be stored at the memory of biometric sensor device 230 in encrypted form. In one or more embodiments, the secure access information for RDP server 240 may be stored at RDP client 220, at a cloud server in the network environment, at PAA ticket server 270, or at another client or server device of the network environment. The secure access information for RDP server 240 may include host locations of RDP server 240, a user identification, user credentials, or other secret information for accessing RDP server 240. The server-side unlock information 318 for RDP server 240 is only accessible by RDP client 220 when the target user has been authenticated and has been authorized to unlock the secure access information for RDP server 240. When the target user has been authenticated and authorized, the secure access information for RDP server 240 and the server-side unlock information 318 for RDP server 240 may be unlocked and made accessible to RDP client 220. RDP client 220 may communicate the encrypted biometric information of the target user 316, the server-side unlock information 318 for RDP server 240, and the secure access information for RDP server 240 to PAA ticket server 270 of server information handling system 100 via webserver 250 using the RPD protocol.

PAA ticket server 270 may receive the encrypted biometric information of the target user 316, the server-side unlock information 318 for RDP server 240, and the secure access information for RDP server 240 from RDP client 220 utilizing the RDP protocol and the server-side software 214. In response, PAA ticket server 270 may unlock server-side access information 320 for RDP server 240 based on the received server-side unlock information 318 utilizing the server-side software 214. In response to unlocking the server-side access information 320 for RDP server 240, PAA ticket server 270 may authenticate the target user based on the received encrypted biometric information of the target user 316 of RDP client 220 using the server-side software 214. When the target user of RDP client 220 has been authorized, PAA ticket server 270 may generate a ticket to allow RDP client 220 to access the requested service of the remote RDP server 240.

Figure 4:
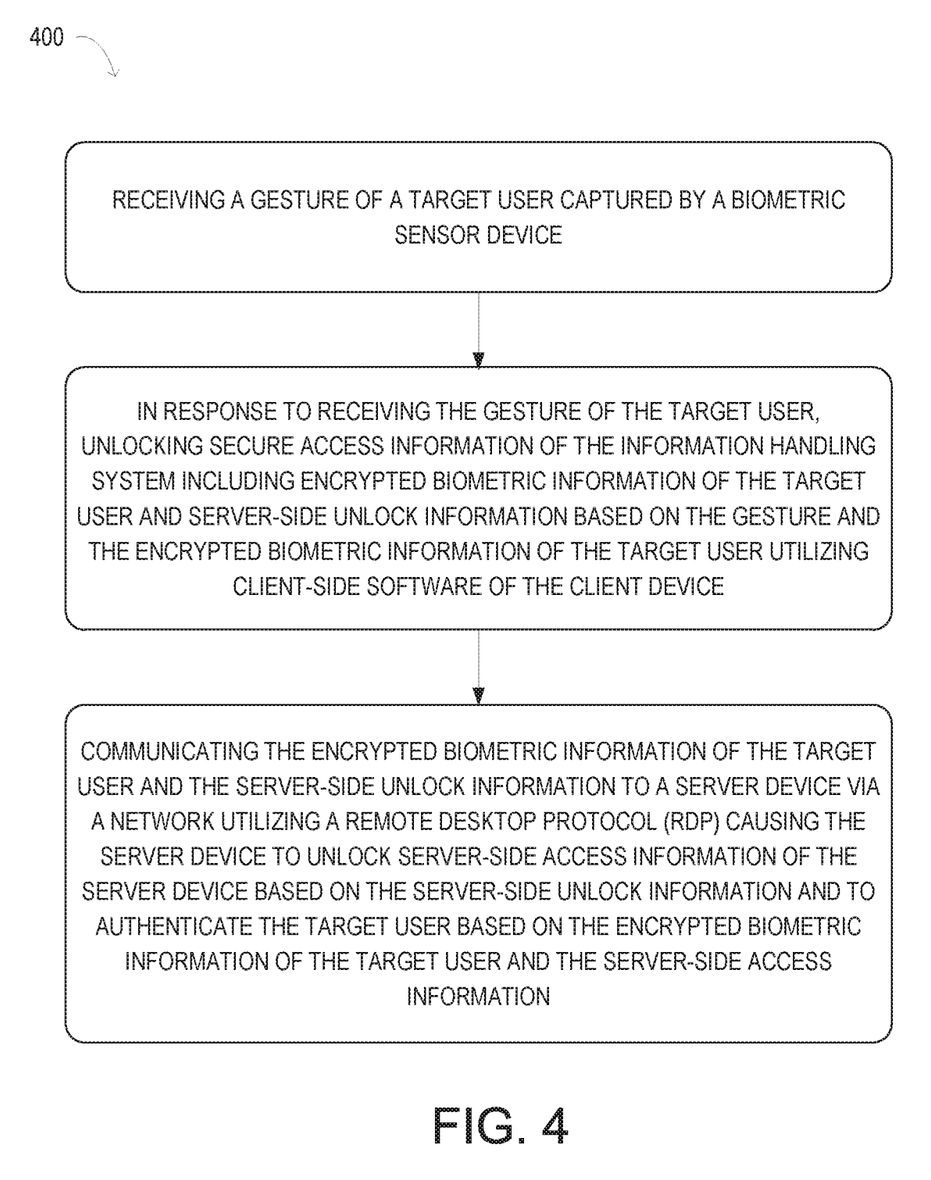
FIG. 4 is a flow chart of selected elements of a method for client-side remote access of a server device from a client device utilizing a biometric sensor device and pluggable authentication and authorization.

Referring now to FIG. 4, a flow chart of selected elements of an embodiment of a method 400 for client-side remote access of a server from a client device utilizing a biometric sensor device and pluggable authentication and authorization, as described herein, is depicted in flowchart form. Method 400 may be performed using network environment 300 for client-side remote access, client-side software of RDP client 220, server-side software of RDP server 240, and biometric sensor device 230. It is noted that certain operations described in method 400 may be optional or may be rearranged in different embodiments.

Method 400 may begin at step 402 by receiving a gesture of a target user captured by a biometric sensor device. At step 404, in response to receiving the gesture of the target user, unlocking secure access information of the information handling system including encrypted biometric information of the target user and server-side unlock information based on the gesture and the encrypted biometric information of the target user utilizing client-side software of the client device. At step 406, communicating the encrypted biometric information of the target user and the server-side unlock information to a server device via a network utilizing a remote desktop protocol (RDP) causing the server device to unlock server-side access information of the server device based on the server-side unlock information and to authenticate the target user based on the encrypted biometric information of the target user and the server-side access information.

Figure 5:
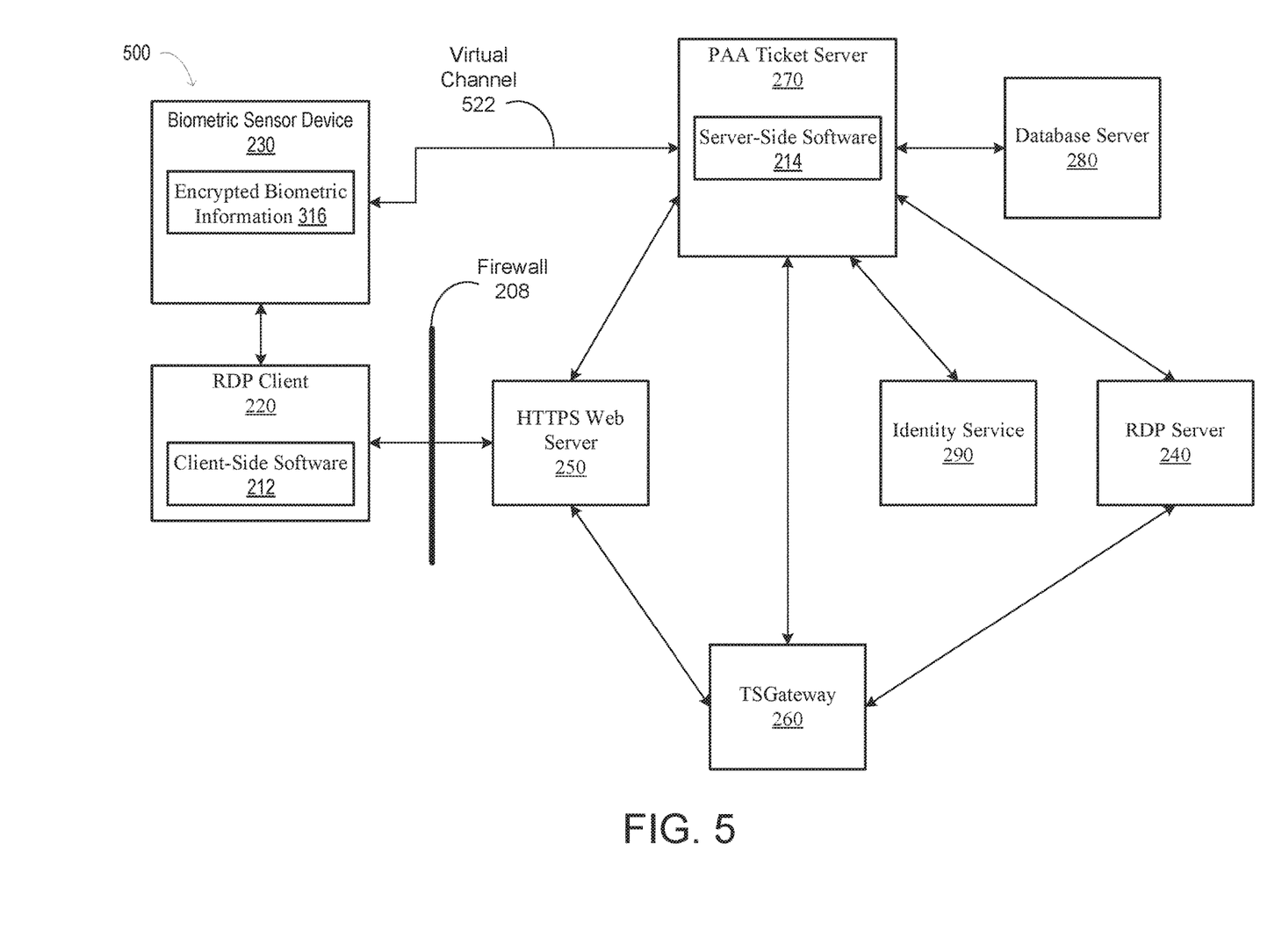
FIG. 5 is an example of a network environment for client-side remote access of a server device from a client device utilizing a biometric sensor device and pluggable authentication and authorization.

FIG. 5 illustrates an example of a network environment 500 for client-side remote access of RDP server 240 utilizing RDP client 220, biometric sensor device 230, the client-side software 212, the server-side software 214, and the PAA framework.

During a run time phase of operation, RDP client 220 may request access to a service of a remote RDP server 240 using the client-side software 212. In response to the access request, the client-side software 212 may receive a gesture of a target user captured by biometric sensor device 230. In response to receiving the gesture of the target user, the client-side software 212 may authenticate the target user based on the received gesture and the encrypted biometric information of the target user 316 stored at the memory of biometric sensor device 230. RDP client 220 may establish a virtual channel 522 between RDP client 220 and server information handling system 100. When RDP client 220 establishes virtual channel 522, RDP client 220 may populate virtual channel 522 with the encrypted biometric information of the target user 316 and the target user of RDP client 220. RDP client 220 may communicate the request to access the service of RDP server 240 to PAA ticket server 270 of server information handling system 100 via webserver 250 using the established virtual channel 522.

PAA ticket server 270 may receive the request to access the service of RDP server 240 from RDP client 220 over virtual channel 522 utilizing the server-side software 214. In response to receiving the request to access the service of RDP server 240, PAA ticket server 270 may authenticate the target user based on the encrypted biometric information of the target user 316 of virtual channel 522 utilizing server-side software 214. When the target user of RDP client 220 has been authorized, PAA ticket server 270 may generate a ticket to allow RDP client 220 to access the requested service of the remote RDP server 240 utilizing the RPD protocol.

Figure 6:
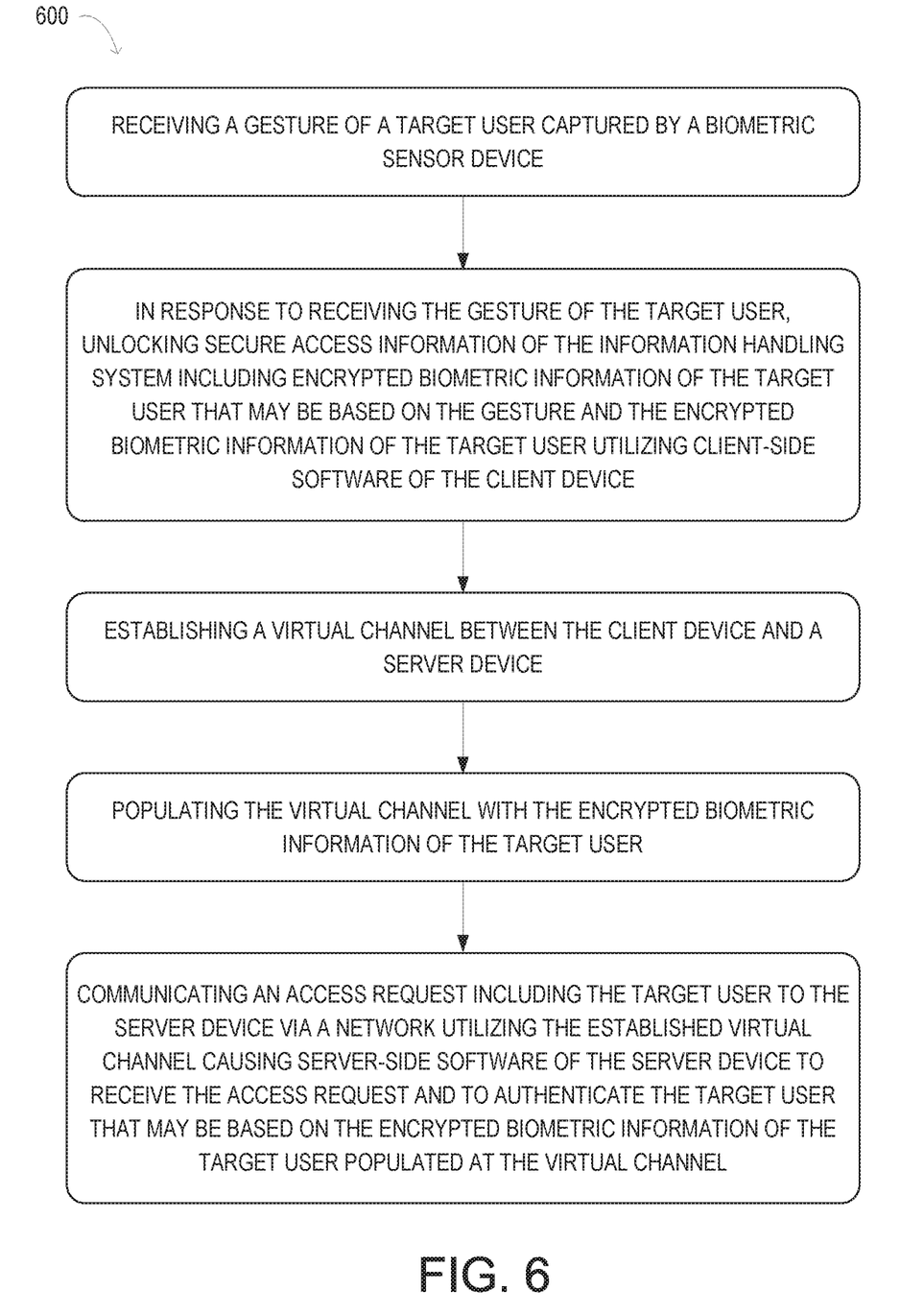
FIG. 6 illustrates an exemplary method for client-side remote access of a server device from a client device utilizing a biometric sensor device and pluggable authentication and authorization.

Referring now to FIG. 6, a flow chart of selected elements of an embodiment of a method 600 for client-side remote access of a server from a client device utilizing a biometric sensor device and pluggable authentication and authorization, as described herein, is depicted in flowchart form. Method 600 may be performed using network environment 500 for client-side remote access, client-side software of RDP client 220, server-side software of RDP server 240, and biometric sensor device 230. It is noted that certain operations described in method 600 may be optional or may be rearranged in different embodiments.

Method 600 may begin at step 602 by receiving a gesture of a target user captured by a biometric sensor device. At step 604, in response to receiving the gesture of the target user, unlocking secure access information of the information handling system including encrypted biometric information of the target user that may be based on the gesture and the encrypted biometric information of the target user utilizing client-side software of the client device. At step 606, establishing a virtual channel between the client device and a server device. At step 608, populating the virtual channel with the encrypted biometric information of the target user. At step 610, communicating an access request including the target user to the server device via a network utilizing the established virtual channel causing server-side software of the server device to receive the access request and to authenticate the target user that may be based on the encrypted biometric information of the target user populated at the virtual channel.

Figure 7:
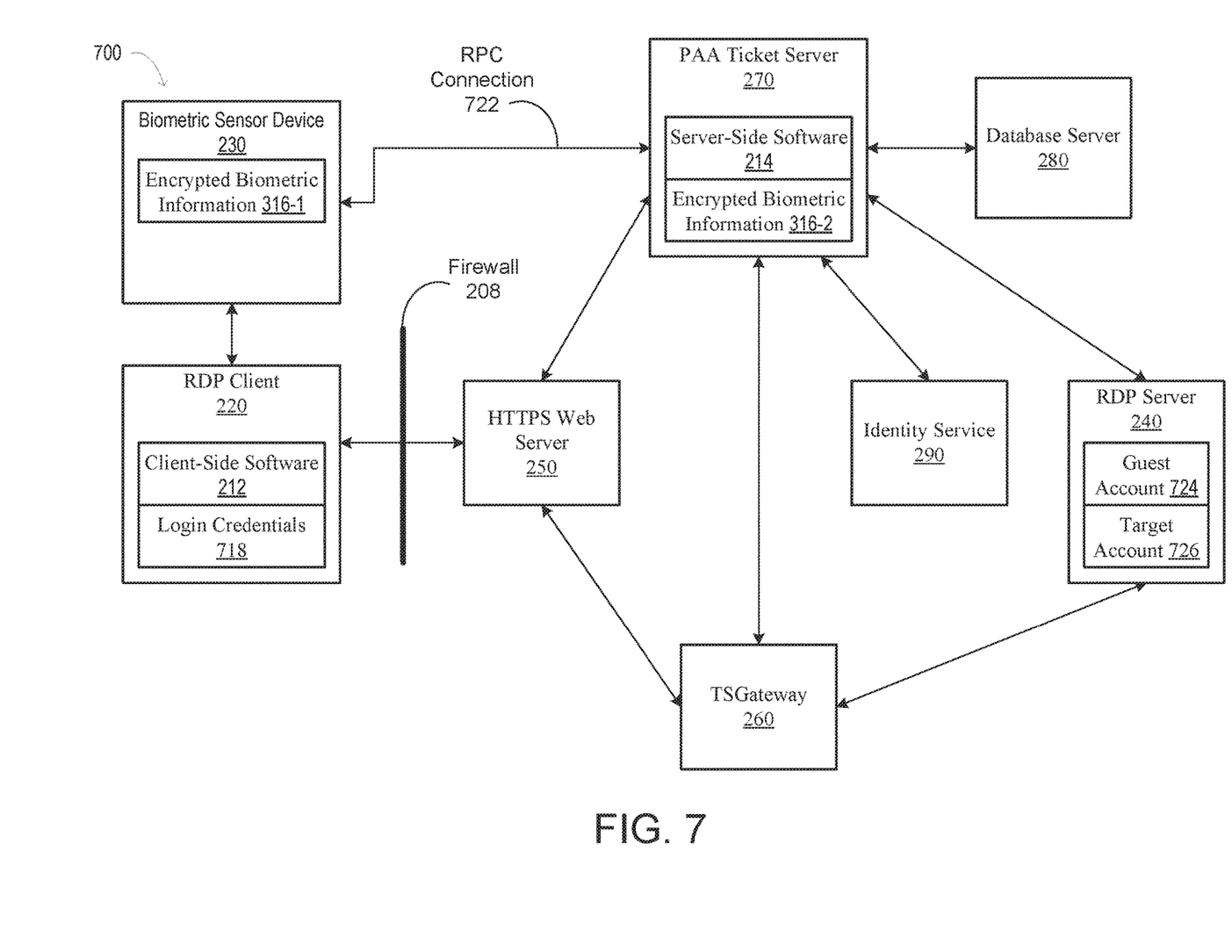
FIG. 7 is an example of a network environment for client-side remote access of a server device from a client device utilizing a biometric sensor device and pluggable authentication and authorization.

FIG. 7 illustrates an example of a network environment 700 for client-side remote access of RDP server 240 utilizing RDP client 220, biometric sensor device 230, client-side software 212, server-side software 214, and the PAA framework.

During a run time phase of operation, RDP client 220 may request access to a service of a remote RDP server 240 using client-side software 212. In response to the access request, RDP client 220 may access webserver 250 to allow client-side software 212 to enter a previously established set of login credentials 718 to open a guest account 724 on a remote host of RDP server 240 and establish a RDP session over RPC connection 722 between RDP client 220 and the remote host of RDP server 240. The set of login credentials 718 may include a user identification and password associated with a particular user of RDP client 220 and guest account 724. The set of login credentials 718 may be encrypted and stored at a memory of RDP client 220. The set of login credentials 718 may have been established during a registration phase of operation during a registration process between the particular user of RDP client 220 and PAA ticket server 270. Once guest account 724 has been opened and the RDP session has been established, the PAA ticket server 270 may utilize the RDP protocol for remote I/O processed on RDP client 220. Server-side software 214 may be utilized to authenticate a target user to a target account 726 on the remote host of RDP server 240. Server-side software 214 may receive a gesture of the target user that is captured by biometric sensor device 230 of RDP client 220 utilizing the RDP protocol via RPC connection 722. In response to receiving the gesture of the target user, server-side software 214 may authenticate the target user based on the received gesture and previously registered biometric information of the target user 316-2 securely stored at a memory of PAA ticket server 270 in encrypted form.

Encrypted biometric information of the target user 316-2 may be decrypted when server-side software 214 utilizes encrypted biometric information of the target user 316-2 to authenticate the target user. When the target user has been authenticated, server-side software 214 may switch RDP client 220 access from guest account 724 to target account 726 so that RDP client 220 may access the requested service of RDP server 240. In one or more other embodiments, server-side software 214 may authenticate the target user utilizing virtual IO and the RDP protocol over RPC connection 722 to access biometric sensor device 230 of RDP client 220 based on encrypted biometric information 316-1 stored at the memory of biometric sensor device 230.

Figure 8:
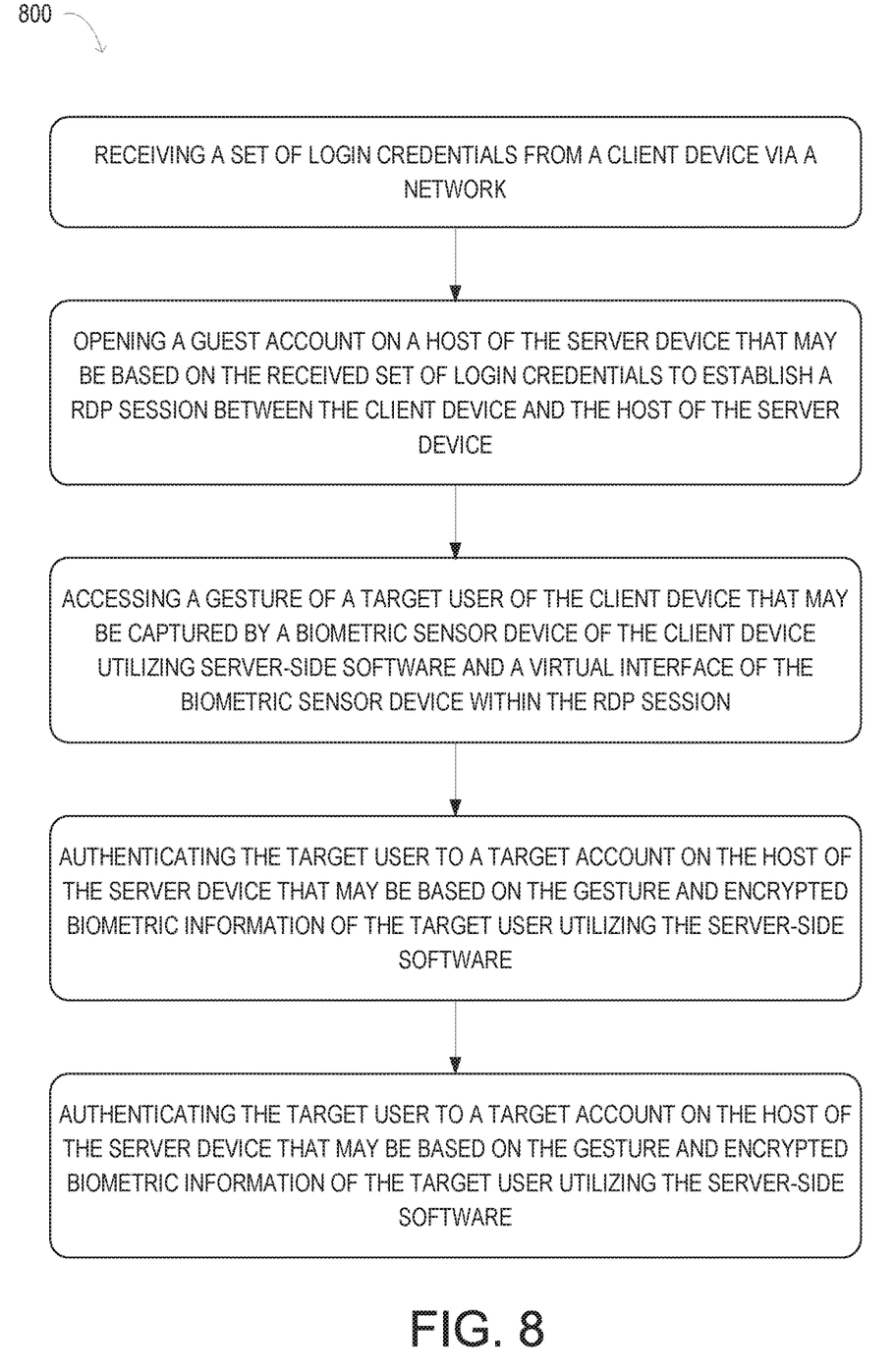
FIG. 8 illustrates an exemplary method for client-side remote access of a server device from a client device utilizing a biometric sensor device and pluggable authentication and authorization.

Referring now to FIG. 8, a flow chart of selected elements of an embodiment of a method 800 for client-side remote access of a server from a client device utilizing a biometric sensor device and pluggable authentication and authorization, as described herein, is depicted in flowchart form. Method 800 may be performed using network environment 700 for client-side remote access, client-side software of RDP client 220, server-side software of RDP server 240, and biometric sensor device 230. It is noted that certain operations described in method 800 may be optional or may be rearranged in different embodiments.

Method 800 may begin at step 802 by receiving a set of login credentials from a client device via a network. At step 804, opening a guest account on a host of the server device that may be based on the received set of login credentials to establish a remote desktop protocol (RDP) session between the client device and the host of the server device. At step 806, accessing a gesture of a target user of the client device that may be captured by a biometric sensor device of the client device utilizing server-side software and a virtual interface of the biometric sensor device within the RDP session. At step 808, authenticating the target user to a target account on the host of the server device that may be based on the gesture and encrypted biometric information of the target user utilizing the server-side software. At step 810, when the target user may be authenticated, opening the target account and switch from the guest account to the target account that may allow the client device to access the target account.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system comprising:
a biometric sensor device; and
a client device coupled to the biometric sensor device, the client device including a processor having access to memory media storing instructions executable by the processor to perform operations comprising:
receive a gesture of a target user captured by the biometric sensor device;
in response to receiving the gesture of the target user, unlock secure access information of the information handling system including encrypted biometric information of the target user and server-side unlock information based on the gesture and the encrypted biometric information of the target user utilizing client-side software of the client device, wherein the secure access information is stored at the biometric sensor device; and
communicate the encrypted biometric information of the target user and the server-side unlock information to a server device via a network utilizing a remote desktop protocol (RDP) to cause server-side software of the server device to:
unlock server-side access information of the server device based on the server-side unlock information; and
authenticate the target user based on the encrypted biometric information of the target user and the server-side access information.

2. The information handling system of claim 1, wherein the biometric sensor device is at least one of a fingerprint reader, a facial recognition device, a gesture recognition device, an iris recognition device, a retinal scan identification device, a hand geometry recognition device, a voice recognition device, a vein and facial characteristics recognition device, and an illuminated IR sensor, and wherein the gesture is at least one of a fingerprint, a face, a user gesture, an eye, a hand, a voice, and a vein.

3. The information handling system of claim 1, wherein the biometric sensor device includes hardware configured to:
capture biometric information of the target user; and
match the biometric information of the target user to previously captured and authorized biometric information of the target user.

4. The information handling system of claim 1, wherein the client-side software includes software configured to request access to a service of the server device.

5. The information handling system of claim 1, wherein the server-side software includes software configured to authenticate and authorize the target user to access a protected service.

6. The information handling system of claim 1, wherein the biometric sensor device provides multifactor authentication policies to enforce user identity protection.

7. An information handling system comprising:
a biometric sensor device; and
a client device coupled to the biometric sensor device, the client device including a processor having access to memory media storing instructions executable by the processor to perform operations comprising:
receive a gesture of a target user captured by the biometric sensor device;
in response to receiving the gesture of the target user, unlock secure access information of the information handling system including encrypted biometric information of the target user based on the gesture and the encrypted biometric information of the target user utilizing client-side software of the client device, wherein the secure access information is stored at the biometric sensor device;
establish a virtual channel between the client device and a server device;
populate the virtual channel with the encrypted biometric information of the target user; and
communicate an access request including the target user to the server device via a network utilizing the established virtual channel to cause server-side software of the server device to:
receive the access request; and
authenticate the target user based on the encrypted biometric information of the target user populated at the virtual channel.

8. The information handling system of claim 7, wherein the biometric sensor device includes hardware configured to:
capture biometric information of the target user; and
match the biometric information of the target user to previously captured and authorized biometric information of the target user.

9. The information handling system of claim 7, wherein the client-side software includes software configured to request access to a service of the server device.

10. The information handling system of claim 7, wherein the server-side software includes software configured to authenticate and authorize the target user to access a protected service.

11. An information handling system comprising:
a server device including a processor having access to memory media storing instructions executable by the processor to perform operations comprising:
receive a set of login credentials from a client device via a network;
open a guest account on a host of the server device based on the received set of login credentials to establish a remote desktop protocol (RDP) session between the client device and the host of the server device;
access a gesture of a target user of the client device captured by a biometric sensor device coupled to the client device utilizing server-side software and a virtual interface of the biometric sensor device within the RDP session;
authenticate the target user to a target account on the host of the server device based on the gesture and encrypted biometric information of the target user utilizing the server-side software, wherein the encrypted biometric information of the target user is stored at the biometric sensor device; and
when the target user is authenticated: open the target account; and
switch from the guest account to the target account to allow the client device to access the target account.

12. The information handling system of claim 11, wherein the server-side software includes software configured to authenticate and authorize the target user to access a protected service.

13. The information handling system of claim 11, wherein the virtual interface comprises a virtual universal serial bus (USB) interface of the biometric sensor device.

14. The information handling system of claim 11, wherein the biometric sensor device is at least one of a fingerprint reader, a facial recognition device, a gesture recognition device, an iris recognition device, a retinal scan identification device, a hand geometry recognition device, a voice recognition device, a vein and facial characteristics recognition device, and an illuminated IR sensor, and wherein the gesture is at least one of a fingerprint, a face, a user gesture, an eye, a hand, a voice, and a vein.

* * * * *